April 11, 1961 U. H. MARTENSEN 2,979,138
FLEXIBLE DISK TILLER
Filed Jan. 28, 1959 3 Sheets-Sheet 1
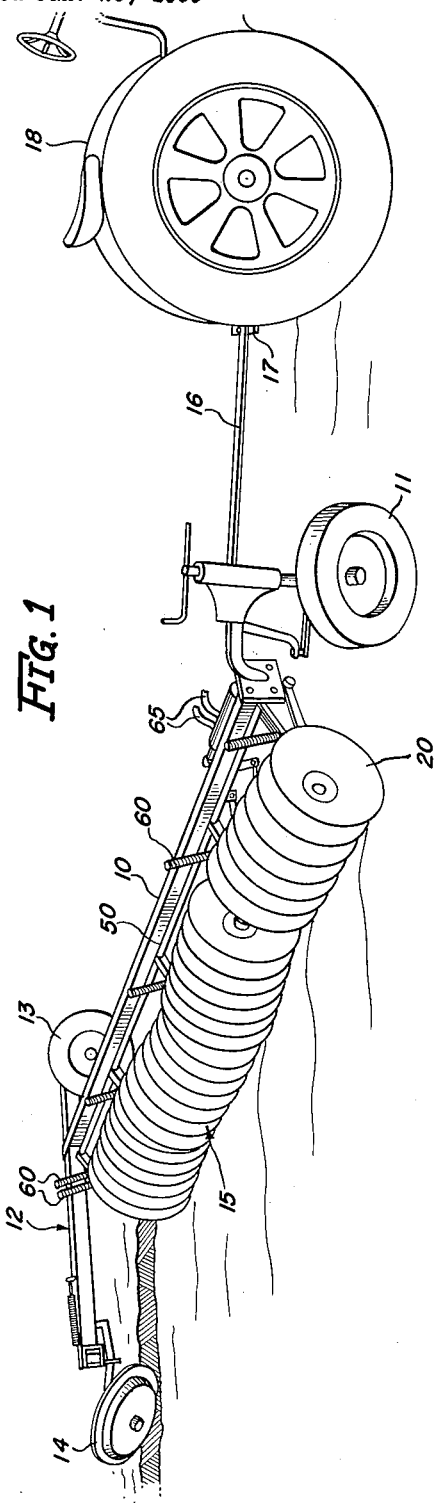
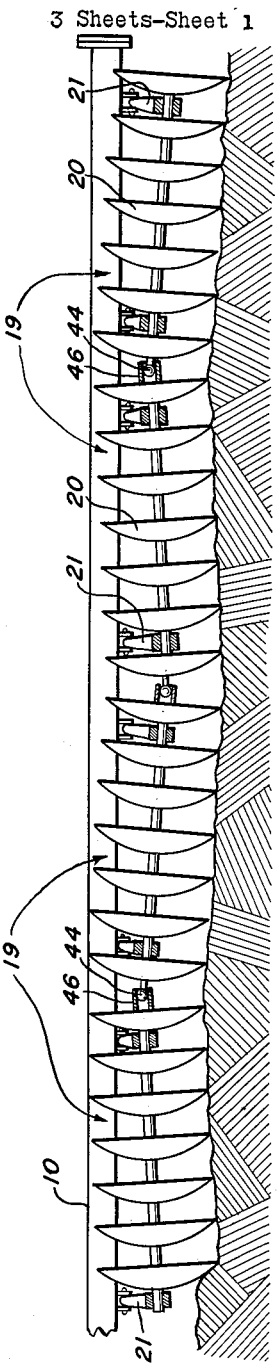
INVENTOR
Uwe Henrich Martensen
Paul O. Pippel
ATTORNEY

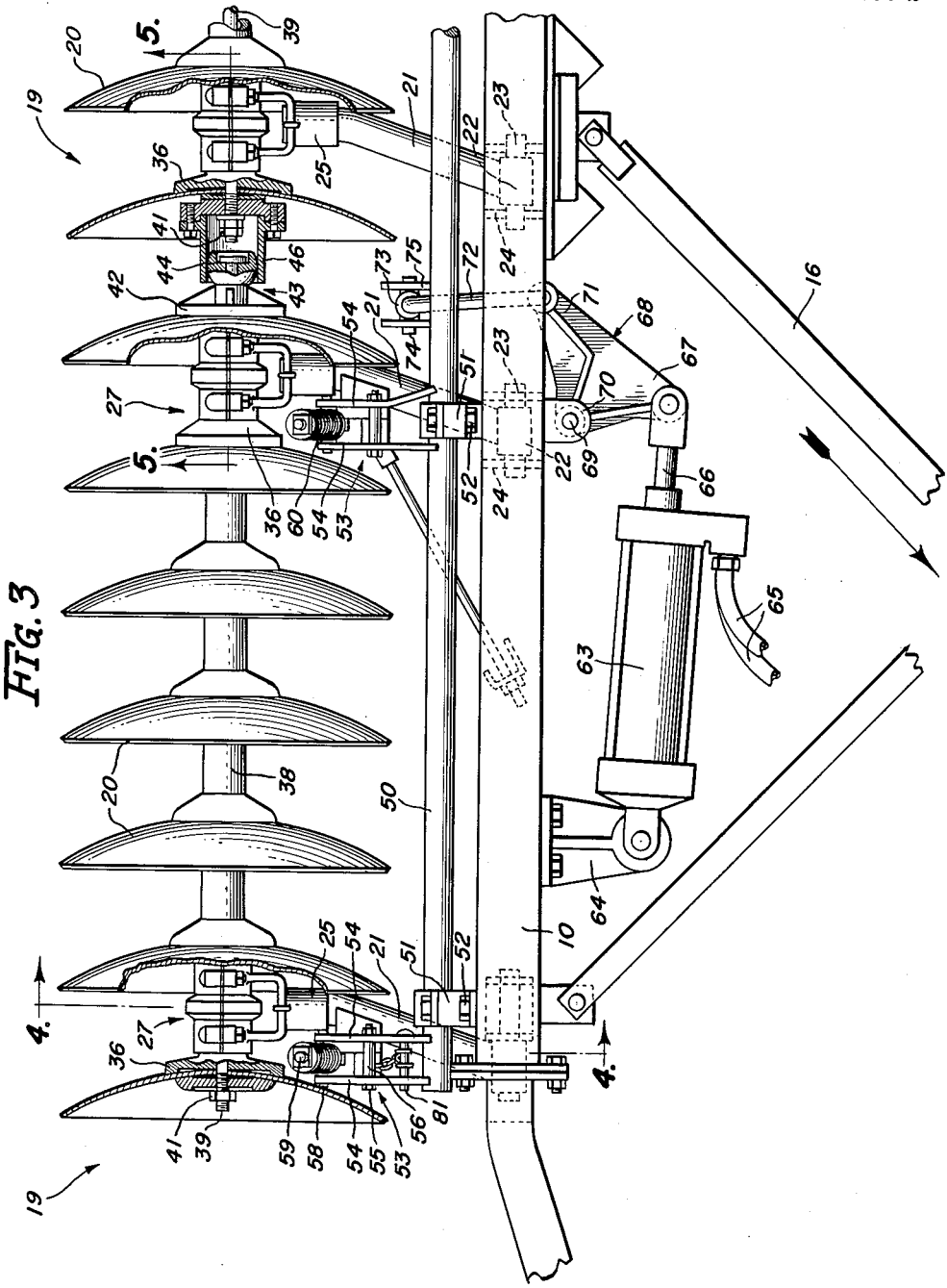

INVENTOR
Uwe Henrich Martensen

ATTORNEY

United States Patent Office 2,979,138
Patented Apr. 11, 1961

2,979,138

FLEXIBLE DISK TILLER

Uwe H. Martensen, Burlington, Ontario, Canada, assignor to International Harvester Company, Chicago, Ill., a corporation of New Jersey Filed Jan. 28, 1959, Ser. No. 789,617

9 Claims. (Cl. 172—579)

This invention relates to agricultural implements and particularly to the class of implements known as disk tillers.

Disk tillers such as harrow plows and the like extend diagonally of the direction of travel and operate over a wide strip of ground in which irregularities occur to which the series of disks should conform as nearly as possible so that the tillage of the ground over which the implement passes will be substantially uniform. Wide angle tillers or plows of this type have previously been made of several gangs which have been independently flexibly mounted on the carrying frame to allow the gangs to follow the contour of the ground. However, the gangs have been mounted for flexing as a unit and each gang covers a rather wide strip in which irregularities occur. Also, between adjacent end disks of adjacent gangs it has been possible for one end disk to move up with its gang while the end disk of the other gang moved down when different ground levels were encountered by adjacent gangs. It has also been possible for one end of the gang to be elevated above the ground while the opposite end is in contact therewith.

The present invention overcomes disadvantages inherent in previous implements of this type and has for its object the provision of an improved wide angle disk tiller comprising several gangs mounted on a frame and interconnected in such a way that the entire line of disks is capable of assuming sinuous conformation adapting it to the changes in the curvature of the ground over which it travels.

Another object of the invention is the provision of an improved disk tiller of the wide angle type including a plurality of independently mounted disk gangs, the adjacent ends of which are connected by means accommodating relative angling of the adjacent gangs while preventing relative vertical movement of said adjacent ends.

Another object of the invention is the provision of an improved disk tiller comprising independently mounted disk gangs capable of vertical flexing relative to the supporting frame and having adjacent ends of the gangs interconnected by combined universal joint and telescoping means accommodating limited relative axial movement as well as angling between the gangs.

A further object of the invention is the provision of an improved disk tiller of the wide angle type having a wheeled frame and improved means for flexibly mounting the disk gangs on the frame.

Other objects and advantages of the invention will become clear from the following detailed description when read in conjunction with the accompanying drawings, wherein:

Figure 1 is a view in perspective of the rear end of a tractor having connected thereto in trail-behind relation a wide angle disk tiller embodying the features of this invention;

Figure 2 is a diagrammatic view in elevation showing a series of rigid disk gangs interconnected and the sinuous conformation assumed by the gangs to accommodate them to variations in contour of the ground;

Figure 3 is an enlarged plan view of a portion of the disk tiller shown in Figure 1;

Figure 4:
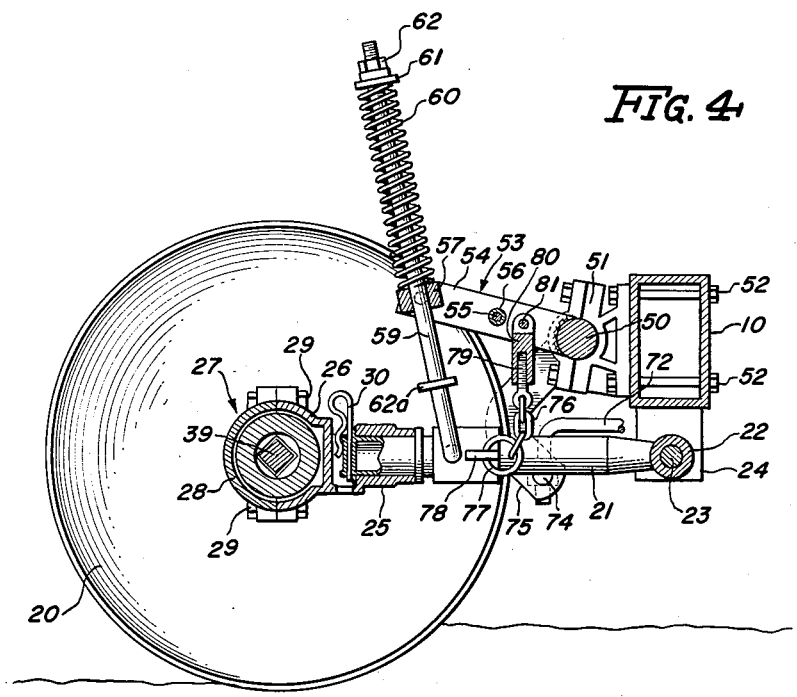
Figure 4 is a section taken on the line 4—4 of Figure 3.

In the drawings, the numeral 10 designates the diagonally extending tool carrying frame of a wide angle disk tiller embodying the features of this invention supported at its front end by a furrow wheel 11 and at its rear end by a truck 12 carrying a land wheel 13 and a rear furrow wheel 14. The wheel supports referred to form no part of the invention claimed herein. However, it may be understood that the implement with which this invention is concerned is of the type wherein the tool carrying frame 10 maintains substantially the same height with respect to the ground in operating as well as transport position, while the line of disk gangs designated at 15 is raised and lowered with respect to the frame. The implement is provided with a conventional draft bar 16 which is connected to the drawbar 17 of a tractor 18.

The tool carrying frame 10, as shown in Figure 1, extends diagonally of the direction of travel, and the line of disks 15 is generally parallel thereto. The implement comprises a plurality of disk gangs 19, each of which comprises a plurality of disks 20. At each end of each disk gang 19 a supporting arm 21 is provided, as shown in Figures 2 and 3. Arms 21 extend laterally from the tool carrying frame 10, these arms extending somewhat rearwardly from the tool frame with respect to the direction of travel. One end of each arm 21 has affixed thereto a bearing portion 22 carrying a pivot pin 23 parallel to the frame 10 and supported in openings provided in spaced lugs 24 affixed to and depending from the lower face of the frame 10. Arms 21 are thus capable of vertical swinging about axes parallel to the frame 10.

The arm 21 is cylindrical and the outer end thereof is slidably receivable in a sleeve 25 forming a part of one section 26 of a bearing member 27, another section 28 of which is secured to the section 26 by bolts 29. A cotter pin 30 is receivable in registering openings provided in the sleeve 25 and the end of arm 21.

Figure 5:
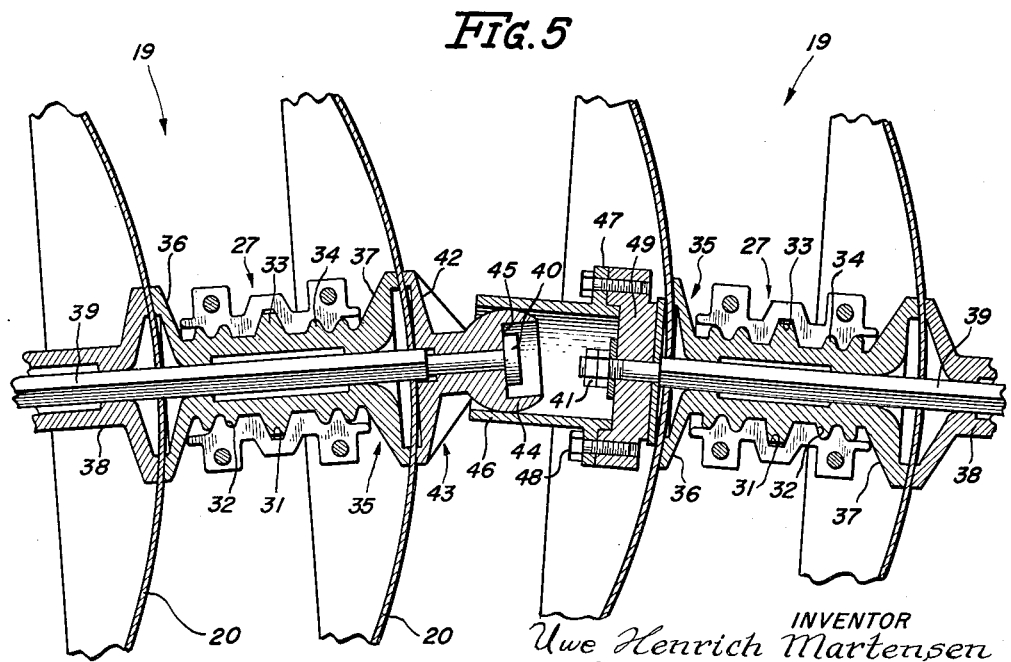
Figure 5 is a section taken on the line 5—5 of Figure 3 illustrating the universal and telescopic connection between adjacent ends of adjacent gangs and showing angular movement therebetween.

As shown in Figure 5, the inner periphery of each of the bearings 27 is provided with a wedge shaped groove 31 and smaller grooves 32 to rotatably receive projections 33 and 34 on the periphery of a spool 35 having flanges 36 and 37 bearing against adjacent end disks 20 of each gang, the spool 35 serving as a spacer therebetween. The disks intermediate the end disks of each gang are spaced by spools 38 and the disks are secured together as a rigid unit by the provision of a shaft 39, square in cross-section, receivable in complementary openings in the disks and spools and having a head 40 and threaded at its opposite end to receive a nut 41.

Secured against the convex face of the rearmost disk 20 in each gang 19 is the flange 42 of a projection 43 having a semi-spherical portion 44. Member 43 is axially bored to receive shaft 39 and the semi-spherical member 44 is recessed at its end to provide a shoulder 45 engageable by the head 40.

Member 44 functions as a ball telescopically receivable for universal angular movement as well as axial sliding movement in a socket in the form of a cylindrical sleeve 46 having an annular flange 47 apertured to receive bolts 48 by which the socket 46 is affixed to a member 49 mounted on shaft 39 adjacent the endmost disk 20 of the next adjacent disk gang 19.

A rockshaft 50 substantially coextensive with and parallel to frame 10 is rockably supported thereon by spaced bearings 51 affixed to the frame 10 by bolts 52. At spaced locations on shaft 50 corresponding to the locations of arms 21, are lift or rock arms 53, each of which comprises laterally spaced members 54 spaced by a bolt 55 carrying a sleeve 56. A swivel 57 is mounted on trunnions 58 between the arm members 54 and is apertured to slidably receive a rod 59, the lower end of which is pivotally connected to the arm 21, and the upper end of which is surrounded by a coil spring 60. The lower end of spring 60 abuts swivel 57 to which it is anchored while the upper end engages and is anchored to a collar 61 held in place by one or more nuts 62 on the threaded upper end of the rod. A collar 62a secured to the rod 59 below swivel 57 serves to limit downward swinging of arms 53. Spring 60 is under tension, exerting a pulling force on the upper end of rod 59.

Rocking of shaft 50 in a clockwise direction as viewed in Figure 4, raises the disk gangs 19 with respect to the tool carrying frame 10 by power transmission means including a hydraulic cylinder 63 pivotally anchored at one end to a bracket 64 affixed to the frame 10 and supplied with fluid under pressure from a source, not shown, on the tractor 18, through hose lines 65. A piston rod 66 slidable in cylinder 63 is pivotally connected to one arm 67 of a bell crank 68 fulcrumed at 69 on a lug 70 affixed to the frame 10. Another arm 71 of the bell crank is connected by a link 72 to a swivel 73 mounted on trunnions 74 between the ends of a pair of arms 75 affixed to and curving downwardly from rockshaft 50. Thus, the entire series of disk gangs 15 can be vertically moved between operating and transport positions relative to the frame 10 by actuation of the cylinder and piston unit 63, 66. Extension of piston rod 66 in the cylinder raises the disk gang, while they are lowered by retraction of the piston rod.

It should be noted that in an implement of the type shown and described herein the soil forces acting on the implement tend to cause the forward end of the forwardmost disk gang to penetrate deeper, in turn creating a force tending to cause the rear end of the rearmost gang in the series to rise. The latter tendency is overcome by the provision of dual springs 60 at the rear end of the rearmost gang, as shown in Figure 1. The tendency of the foremost gang to penetrate deeper is minmized by the provision of a chain 76 connected to a ring 77 anchored to a lug 78 secured ot the arm 21. A threaded eyebolt 79 connected to the upper end of the chain is adjustably received in a threaded sleeve 80 pivotally connecetd to a pin 81 mounted between the arms of the forwardmost lift arm 53. The sleeve 80 is readily removable from pin 81 and is rotatable to adjust the length of chain 76. The arc of travel of the connection of the upper end of chain 76 to arm 53 is shorter than the connection of the lower end thereof to arm 21 so that the gang gradually tightens as the disk gangs are lowered to operating position and slack is introtduced therein during lifting. The presence of the chain eliminates the tendency of the forwardmost disk to penetrate deeper in the soil and keeps the front gang in line with the others.

By virtue of the flexible construction described, the series of disks 15 is capable of following the contour of the ground and assuming the sinuous conformation indicated in Figures 1 and 2. The telescoping ball joint connection 44, 46 between adjacent ends of adjacent gangs causes the gangs to stay in line preventing relative vertical movement of adjacent ends of the gangs and yet permitting the gangs to flex in the manner required to follow the contour of the ground.

The operation of the flexible disk tiller of this invention should be clearly understood from the foregoing description. It should likewise be understood that the invention has been described in its preferred embodiment only, and that modifications may be made in the invention without departing from the spirit thereof or the scope of the appended claims.

What is claimed is:

1. In a disk tiller including a supporting frame extending diagonally of the direction of travel and wheel supports for the front and rear ends of said frame, a plurality of disk gangs, means connecting each said gang to said frame accommodating independent vertical movement of opposite ends of said gang to adapt it to changes in ground contour, and connecting means between adjacent ends of said gangs, accommodating relative angling between said gangs while preventing relative vertical movement between said adjacent ends thereof, said connecting means including means accommodating limited relative axial movement between said gangs.

2. In a disk tiller including a supporting frame extending diagonally of the direction of travel and wheel supports for the front and rear ends of said frame, a plurality of disk gangs, means connecting each said gang to said frame accommodating independent vertical movement of opposite ends of said gang to adapt it to changes in ground contour, and connecting means between adjacent ends of said gangs, said connecting means comprising means serving as a socket on one end of one gang and means serving as a ball at the associated end of the adjacent gang accommodating relative angular and axially sliding movement between said adjacent ends while preventing relative vertical movement therebetween.

3. The invention set forth in claim 1, wherein said connecting means comprises a tubular member carried by one end of one gang and a slidable member carried by the adjacent end of another gang and said slidable member is slidably receivable in said tubular member.

4. The invention set forth in claim 3, wherein said slidable member has a rounded contour engageable with the inner surface of said tubular member throughout the range of axial movement of said slidable member therein to accommodate relative angular movement therebetween.

5. In a disk tiller including a supporting frame extending diagonally of the direction of travel and wheel supports for the front and rear ends of said frame, a plurality of disk gangs disposed in a line, each of which includes a plurality of axially aligned disks rigidly interconnected and held against independent movement relative to each other, and interconnecting means between said gangs and said frame accommodating vertical floating movement of the interconnected ends of said gangs and permitting the gangs to assume a sinuous conformation according to the contour of the ground traversed, comprising a flexible connection between opposite ends of each of said gangs and said frame, and means accommodating relative pivoting between said gangs connecting adjacent ends thereof.

6. In a disk tiller including a supporting frame extending diagonally of the direction of travel and wheel supports for the front and rear ends of said frame, a plurality of disk gangs disposed in a line, each of which includes a plurality of axially aligned disks rigidly interconnected and held against independent movement relative to each other, interconnecting means between said gangs and said frame accommodating vertical floating movement of the interconnected ends of said gangs and permitting the gangs to assume a sinuous conformation according to the contour of the ground traversed, comprising arms connected to said gangs extending outwardly from said frame and pivotally connected thereto for vertical swinging, and means telescopically pivotally connecting the end of one gang to the end of the adjacent gang preventing relative vertical movement between adjacent ends thereof while accommodating relative pivoting therebetween.

7. In a disk tiller including a supporting frame extending diagonally of the direction of travel and wheel supports for the front and rear ends of the frame, a plurality of rigid gangs of disks in general alignment in a plane parallel to the frame, and means flexibly mounting said gangs on the frame for vertical movement between operating and transport positions and for tilting of the individual gangs about transverse axes to accommodate them to variations in ground contour, comprising supporting arms pivoted to said frame on axes parallel thereto and connected to each of said gangs to accommodate relative vertical movement of the ends thereof, a rockshaft mounted on the frame above said supporting arms, rock arms mounted on the rockshaft, yieldable connecting means between said rock arms and said supporting arms adapted to bias said arms and the disk gangs carried thereby downwardly while accommodating upward movement of the gangs, and an additional connection between the forwardmost rockshaft and the forwardmost supporting arm of the forwardmost disk gang limiting the downward movement of the forward end of the latter, comprising a flexible link, the connection of said link to the supporting arm being at a greater distance from the pivot axis thereof than the connection of said link to the rock arm is from the axis of the rockshaft.

8. The invention set forth in claim 7, wherein said link is a chain which is adjustable in length.

9. In a disk tiller including a supporting frame extending diagonally of the direction of travel and wheel supports for the front and rear ends of the frame, a plurality of rigid gangs of disks in general alignment in a plane parallel to the frame, means pivotally connecting the adjacent ends of the gangs to prevent independent relative vertical movement between said adjacent ends while accommodating relative angular movement between the gangs on the supporting frame to minmize the effect of unitary tiller wherein the said forces acting on the tiller tend to force the forwardmost end downwardly and the rearmost end upwardly, and means for mounting said gangs on the supporting frame to minimize the effect of said soil forces, comprising spring means operatively connected between the frame and the front and rear ends of each of said gangs for urging the latter downwardly, and relatively stronger spring means connected between the frame and the rear end of the rearmost gang.

References Cited in the file of this patent

UNITED STATES PATENTS

| | | |
|---|---|---|
| Re. 24,018 | Silver et al. | June 7, 1955 |
| 427,855 | Glass | May 13, 1890 |
| 1,509,748 | Billings | Sept. 23, 1924 |
| 1,645,994 | Lloyd | Oct. 28, 1927 |
| 1,832,649 | Orelind | Nov. 17, 1931 |
| 2,177,026 | Nightenhelser et al. | Oct. 24, 1939 |